United States Patent
Schlenker et al.

(10) Patent No.: US 11,168,750 B2
(45) Date of Patent: Nov. 9, 2021

(54) ROTOR ASSEMBLY FOR RESOLVING INCOMPLETE GEAR SHIFT OF A ROTORY MIXER

(71) Applicant: Caterpillar Paving Products Inc., Brooklyn Park, MN (US)

(72) Inventors: Brian J. Schlenker, Shoreview, MN (US); Jason W. Muir, Andover, MN (US); Ryan A. Enot, Dunlap, IL (US); Jacob M. Saari, Otsego, MN (US); Derek Nieuwsma, Loretto, MN (US); Nathaniel S. Doy, Maple Grove, MN (US); Lee M. Hogan, Champlin, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 16/264,919

(22) Filed: Feb. 1, 2019

(65) Prior Publication Data
US 2020/0248763 A1 Aug. 6, 2020

(51) Int. Cl.
*F16D 48/06* (2006.01)
*B01F 7/02* (2006.01)
(Continued)

(52) U.S. Cl.
CPC .............. *F16D 48/06* (2013.01); *B01F 7/02* (2013.01); *B01F 15/00201* (2013.01);
(Continued)

(58) Field of Classification Search
CPC ........... F16D 48/06; F16D 2500/70424; F16D 2500/1112; F16D 2500/1027;
(Continued)

(56) References Cited

U.S. PATENT DOCUMENTS 4,760,902 A * 8/1988 Bellanger .............. B60K 17/28
192/103 F
5,099,711 A 3/1992 Langbo et al.
(Continued)

FOREIGN PATENT DOCUMENTS

CN 102433829 * 4/2015
GB 2159899 A 12/1985

*Primary Examiner* — Mark A Manley

(57) ABSTRACT

A rotor assembly for a rotary mixer is disclosed. The rotor assembly includes a main drive configured to rotatably drive the rotor assembly, a main drive clutch enclosed in a drivetrain housing of the main drive, an actuation valve operably coupled to the main drive clutch, the actuation valve configured to actuate the main drive clutch between at least a first position and a second position, a rotor drum, a rotor drive gearbox having an input and an output, the gearbox output operably coupled to the rotor drum, a main drive belt rotatably coupled to the main drive clutch and the rotor drive gear box input such that a rotation of the main drive clutch imparts a rotation on the rotor drive gear box, and a speed sensor operably coupled to the rotor drum, the speed sensor measuring a rotational speed of the gearbox and generating a rotor speed signal, wherein based on when the rotor speed signal is below a predetermined rotor speed threshold the actuation valve is activated to rotate the main drive clutch a predetermined amount between the first position and the second position.

20 Claims, 5 Drawing Sheets

(51) Int. Cl.
*E01C 23/06* (2006.01)
*F16H 63/44* (2006.01)
*B01F 15/00* (2006.01)
*B01F 13/10* (2006.01)

(52) U.S. Cl.
CPC ...... *B01F 15/00538* (2013.01); *E01C 23/065* (2013.01); *F16H 63/44* (2013.01); *B01F 2013/1086* (2013.01); *B01F 2015/00629* (2013.01); *F16D 2500/1027* (2013.01); *F16D 2500/1112* (2013.01); *F16D 2500/70402* (2013.01); *F16D 2500/70424* (2013.01); *F16D 2500/7109* (2013.01)

(58) Field of Classification Search
CPC ... F16D 2500/70402; F16D 2500/7109; F16D 2500/111; F16D 2500/30426; F16D 2500/5048; F16D 23/025–0612; F16D 2023/0693; F16D 2500/30816; F16D 2500/7041; B01F 7/02; B01F 15/00201; B01F 15/00538; B01F 2013/1086; B01F 2015/0629; B01F 15/00123; B01F 15/00435; B01F 13/0035; F16H 63/44; B60W 30/186; B60W 2300/17; B60W 2510/0241; A01D 69/08; A01D 49/04; E01C 21/00

See application file for complete search history.

(56) References Cited

U.S. PATENT DOCUMENTS

| | | | |
|---|---|---|---|
| 5,389,053 | A | 2/1995 | Steeby et al. |
| 6,358,183 | B1 | 3/2002 | Hughes et al. |
| 7,827,876 | B2 | 11/2010 | Guggolz et al. |
| 2014/0348585 | A1* | 11/2014 | Nacke .................. E01C 23/088 404/75 |
| 2016/0169361 | A1* | 6/2016 | Schafer .................. F16H 7/02 299/39.4 |
| 2017/0152916 | A1 | 6/2017 | Schepperle et al. |

* cited by examiner

ROTOR ASSEMBLY FOR RESOLVING INCOMPLETE GEAR SHIFT OF A ROTARY MIXER

TECHNICAL FIELD

The present disclosure relates generally to a rotary mixers, and more particularly to a rotary mixer that allows for adjustment of the rotor drive gear box to resolve incomplete gear shifts while operating the rotary mixer.

BACKGROUND

Rotary mixers are self-propelled machines that can be driven over a surface for repair, stabilization or agricultural purposes. The rotary mixer typically includes a rotor having a plurality of bits radially extending therefrom for engaging the surface being worked. The rotor is driven by an engine or motor of the rotary mixer and coupled thereto with a drive belt and gearbox. The rotary mixer further includes a mixing chamber where the material loosened by the rotor is further pulverized and enhanced, as well as an operator cabin from which an operator can steer the rotary mixer and control operation of the rotor.

Taking the first use of road repair as an example, in-place full depth reclamation is growing in use as the worldwide supply of high quality aggregate becomes more scarce and increasingly expensive to haul. Reclamation offers a cost-effective means to recycle the material that is already in place on the roadway without the time and expense of removing and replacing the old material. With a rotary mixer, existing pavements are pulverized in place along with a portion of the existing base materials to form a new homogeneous base which is then laid back down. Reclamation allows the contractor to not only reuse the materials at hand, but it also provides the opportunity to introduce water or emulsions, and other virgin aggregates to improve the material design. The result is a new, stronger more uniform base. Compared with the costs of other rehabilitation methods such as overlay or reconstruction, reclamation is an economical choice over the life of the rehabilitated road.

With respect to the second example of rotary mixer use, soil stabilization is the process of mechanically or chemically improving the load bearing characteristics of the soil. Additives such as fly ash, Portland cement, and lime can be incorporated into cohesive and semi-cohesive native soil to increase compressive strength or reduce plasticity of the subgrade. When performed with correct additives, stabilization can greatly increase the integrity of the subgrade and provide a material that will have greater support capabilities and moisture resistance. Soil stabilization is of particular use in surface mining where the surface of the ground being mined needs to be continually resurfaced for stability and reuse. Soil stabilization also comes into play in the construction of haul roads or emergency access roads where a pathway or road is required quickly using existing materials.

Finally, with respect to agriculture, rotary mixers can be used in place of traditional soil turning equipment such as plows or discs. As the rotor and mixing chamber of rotary mixers completely pulverizes the material therein, the stalks and nutrient rich bio mass of the prior crop can be pulverized and reintroduced to the soil. Similarly, in bio-remediation, rotary mixers can be used to blend chemicals, fertilizers and microbes with contaminated soil to clean same.

While effective, prior art rotary mixers use an unsynchronized shift mechanism in the rotor drive gearbox. If such shift components are not fully engaged and if use of the rotor is started without the shift components being fully engaged, damage to the rotary mixer can occur. The present disclosure is directed to improving the state of the art set forth above.

SUMMARY OF THE DISCLOSURE

In one aspect of the disclosure a rotor assembly for a rotary mixer is disclosed. The rotor assembly includes a main drive configured to rotatably drive the rotor assembly, a main drive clutch enclosed in a drivetrain housing of the main drive, an actuation valve operably coupled to the main drive clutch, the actuation valve configured to actuate the main drive clutch between at least a first position and a second position, a rotor drum, a rotor drive gearbox having an input and an output, the gearbox output operably coupled to the rotor drum, a main drive belt rotatably coupled to the main drive clutch and the rotor drive gear box input such that a rotation of the main drive clutch imparts a rotation on the rotor drive gear box, and a speed sensor operably coupled to the rotor drum, the speed sensor measuring a rotational speed of the gearbox and generating a rotor speed signal, wherein based on when the rotor speed signal is below a predetermined rotor speed threshold the actuation valve is activated to rotate the main drive clutch a predetermined amount between the first position and the second position.

In another aspect of the disclosure a control system for controlling shifting of a motor assembly is disclosed. The control system includes a main drive configured to rotatably drive the rotor assembly, a main drive clutch enclosed in a drivetrain housing of the main drive, an actuation valve operably coupled to the main drive clutch, the actuation valve configured to actuate the main drive clutch between at least a first position and a second position, a rotor drum, a rotor drive gearbox having an input and an output, the gearbox output operably coupled to the rotor drum, a main drive belt rotatably coupled to the main drive clutch and the rotor drive gear box input such that a rotation of the main drive clutch imparts a rotation on the rotor drive gear box, and a speed sensor operably coupled to the rotor drum, the speed sensor measuring a rotational speed of the gearbox and generating a rotor speed signal, wherein based on when the rotor speed signal is below a predetermined rotor speed threshold the actuation valve is activated to rotate the main drive clutch a predetermined amount between the first position and the second position.

In yet another aspect of the disclosure, a rotary mixer is disclosed. The rotary mixer includes a rotary mixer frame, a power generation source mounted onto and supported by the rotary mixer frame, a rotor assembly operably mounted to the rotary mixer frame, and a control system for controlling shifting of a rotary assembly, the control system including a main drive configured to rotatably drive the rotor assembly, a main drive clutch operably coupled to a drivetrain housing of the main drive, an actuation valve operably coupled to the main drive clutch, the actuation valve configured to actuate the main drive clutch between at least a first position and a second position, a rotor drive gearbox having an input and an output, the gearbox output operably coupled to a rotor of the rotor assembly, a main drive belt rotatably coupled to the main drive clutch and the rotor drive gear box input such that a rotation of the main drive clutch imparts a rotation on the rotor drive gear box, a speed sensor operably coupled to the rotor, the speed sensor measuring a rotational speed of the gear box and generating a rotor speed signal, and a controller communicably coupled to the main drive clutch, the rotor drive gear box and the speed sensor, the controller programmed to receive and analyze the rotor speed signal, when the controller determines the rotor speed signal is below a predetermined rotor speed threshold the controller is further programmed to send a control signal to the actuation valve to rotate the main drive clutch a predetermined amount between the first position and the second position.

These and other aspect and features of the present disclosure will be better understood upon reading the following detailed description when taken in conjunction with the accompanying drawings.

DETAILED DESCRIPTION

Figure 1:
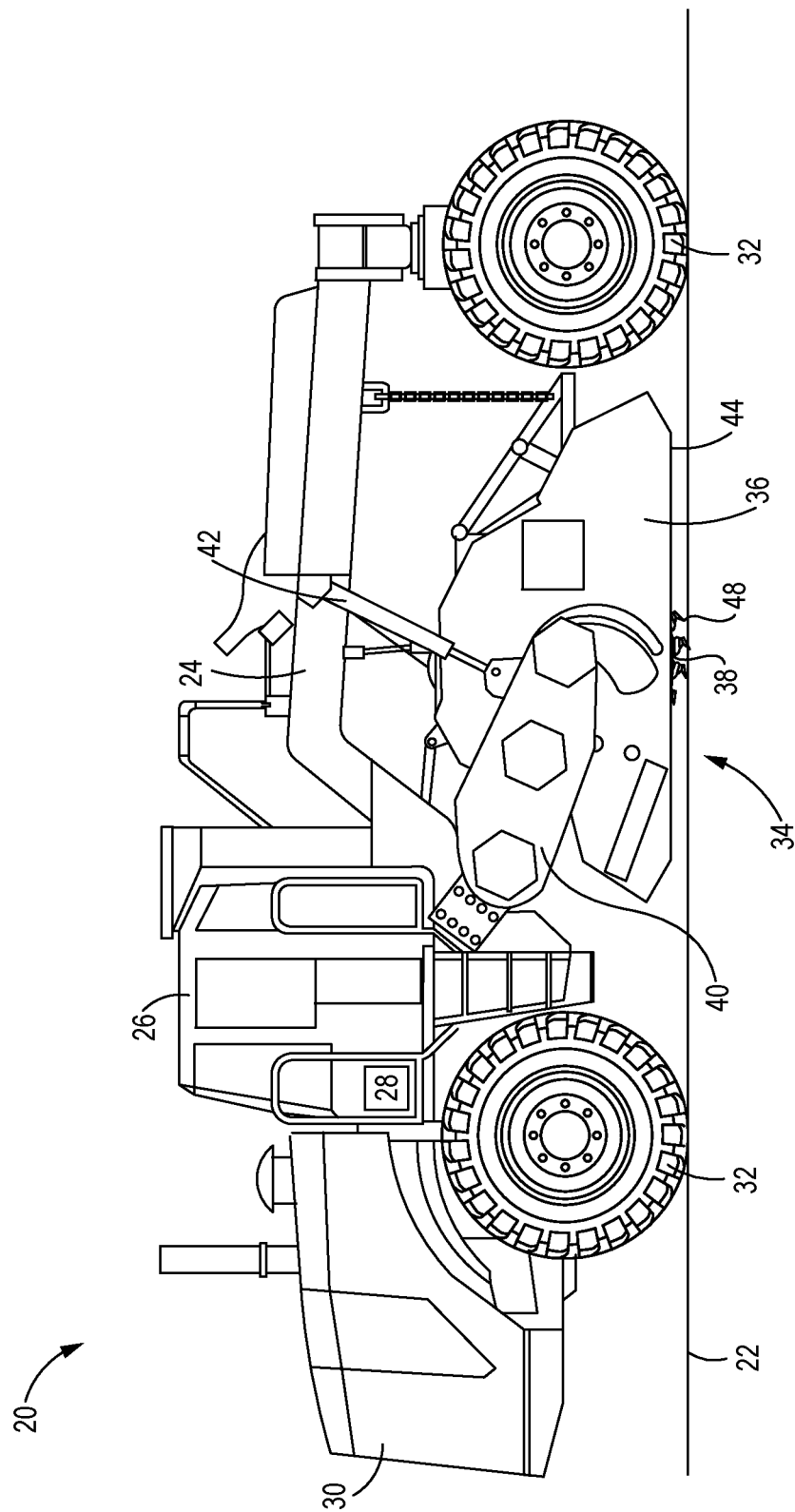
FIG. 1 is a side view of a rotary mixer according to the present disclosure.

An exemplary embodiment of a work machine 20 is shown generally in FIG. 1. One non-limiting example of the work machine 20 may be a rotary mixer; however it will be understood that the embodiments of the present disclosure can be similarly applied to other types of machines and equipment, such as but not limited to, asphalt milling machines, paving machines, cold planers, and the like. Furthermore, as used herein, a rotary mixer refers to a work machine that is used to ground off or otherwise mill a portion of a ground surface 22, such as pavement or soil.

The work machine 20 includes a frame 24 with an operator cab 26. The operator cab 26 provides an enclosure to house one or more operators of the work machine 20. As such, the operator cab 26 may include a plurality of control elements that include but are not limited to, a joystick, a lever, a switch, a button, a monitor, a touch screen, and the like, that can be utilized to control and operate the work machine. Additionally, a machine controller 28 may be mounted within the operator cab 26. The machine controller 28 may be configured or otherwise programmed to control and operate one or more systems of the work machine 20. In some embodiments, the machine controller 28 may be a single controller that is configured to operate a plurality of systems and components of the work machine 20. Alternatively, the work machine 20 may include a plurality of machine controllers 28 programmed and configured to control and operate specific machine systems.

The work machine 20 further includes a power generation source 30 supported by the frame 24, such as an internal combustion engine, an electric motor, a hybrid engine, or other such power generation source. The power generation source 30 supplies the necessary power needed to operate the work machine 20. A set of ground engaging elements 32, such as wheels, are mounted to the frame 24 and operably coupled to the power generation source 30 such that the operator can propel and maneuver the work machine 20 using the control elements located in the operator cab 26. Alternatively, the work machine 20, and more specifically, the machine controller 28, may be configured to allow for remote operation of the work machine such that the operator may control the work machine 20 from a location other than inside the operator cab 26 (e.g., remote location control center, job site location or other such location). Accordingly, the operator may be remotely located around the job site or other such location and the operator may be capable to access the machine controller 28 over a computer network to instruct and operate the work machine 20.

In one embodiment, the work machine 20 further includes a mixing chamber 34 disposed between a front set of ground engaging elements 32 and a rear set of ground engaging elements 32; however it will be understood the mixing chamber 34 may be positioned at an alternative location of the work machine 20. The mixing chamber 34 includes a first side plate 36 and a second side plate (not shown) opposite to the first side plate 36. Furthermore, the first side plate 36 and the second side plate of the mixing chamber 34 may define a housing or other such enclosure for a rotor 38. Moreover, the rotor 38 may be operably coupled to the mixing chamber 34 and the rotor 38 may be configured to rotate within housing defined by the mixing chamber 34. Accordingly, a rotor drive train 40 that is coupled to the frame 24 of the work machine 20 and the first side plate 36 of the mixing chamber 34. Furthermore, the rotor drive train 40 may be operably coupled to the power generation source 30 via a drive rod (not shown) or other power output device. The rotor drive train 40 may be rotatably driven by the drive rod and the rotor drive train 40 subsequently rotatably drives the rotor 38 within the mixing chamber 34.

Additionally, the mixing chamber 34 includes a plurality of hydraulic cylinders 42 coupled to the frame 24 and the mixing chamber 34. The hydraulic cylinders 42 may be activated by the operator to raise and lower the mixing chamber 34 relative to the paved surface 22 or other surface that the work machine 20 is operating on. In one non-limiting example, the hydraulic cylinders 42 are controlled to provide a coarse height adjustment of the rotary mixer 34 and the rotor 38 relative to the paved surface 22. Furthermore, the rotor 38 may be slidably coupled to the mixing chamber 36 such that a fine adjustment of the rotor 38 may be used to raise and/or lower rotor 38 within the mixing chamber 34. Accordingly, in one non-limiting example, the hydraulic cylinders 42 may be operated to adjacently position a bottom portion 44 of the mixing chamber 34 relative to the paved surface 22 such that the bottom portion is spaced a distance above the paved surface 22. The rotor 38 may be further adjusted to extend the rotor 38 downward from the bottom portion 44 of the mixing chamber 34. As such, the rotor 38 may be selectably controlled to extend and/or retract the rotor 38 a desired distance from the bottom portion 44 of the mixing chamber 34 to bring the rotor into contact with the paved surface 22 to remove and/or mix a desired amount of surface material.

Figure 2:
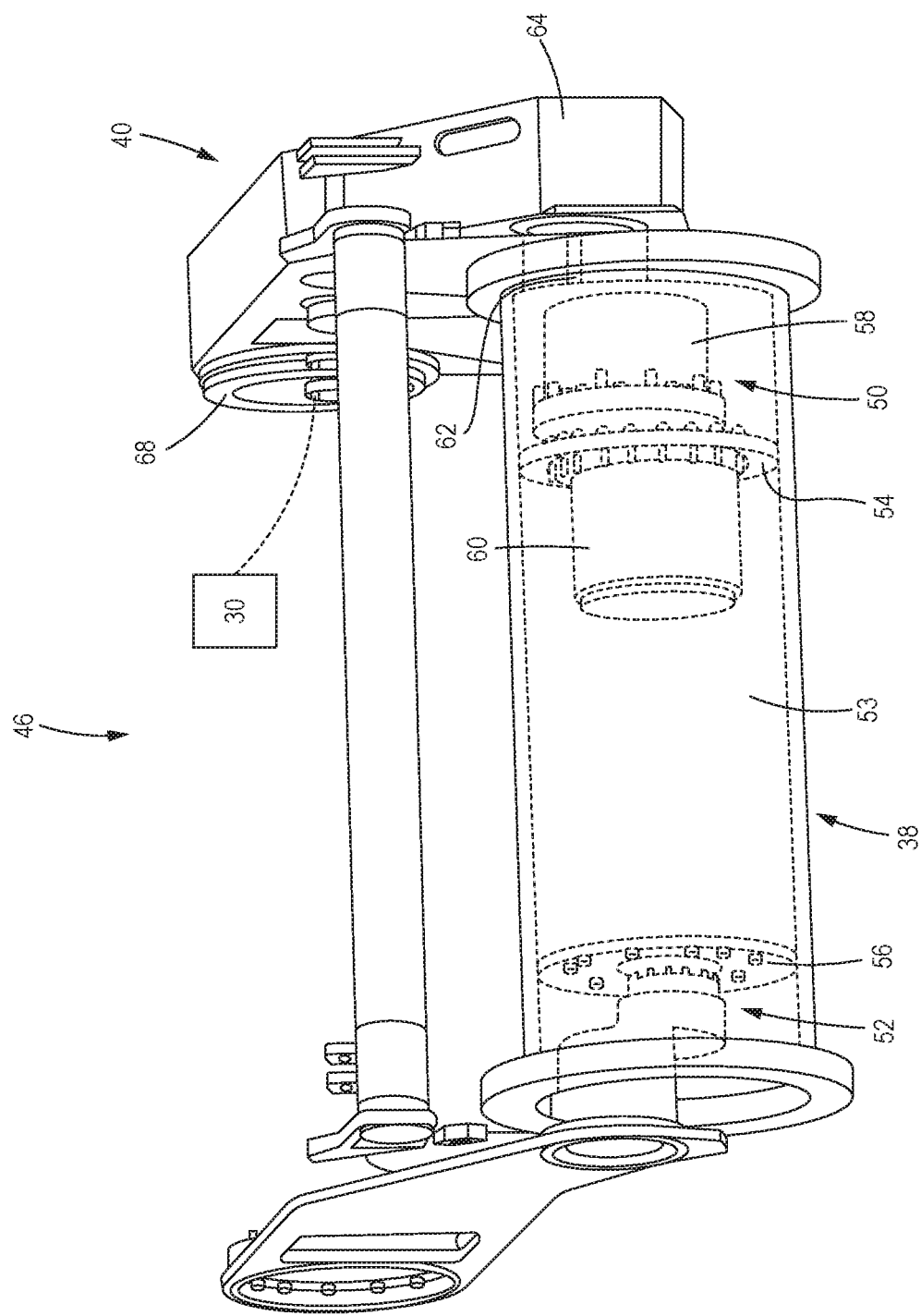
FIG. 2 is a perspective view of a rotor assembly of a rotary mixer according to the present disclosure.
Figure 3:
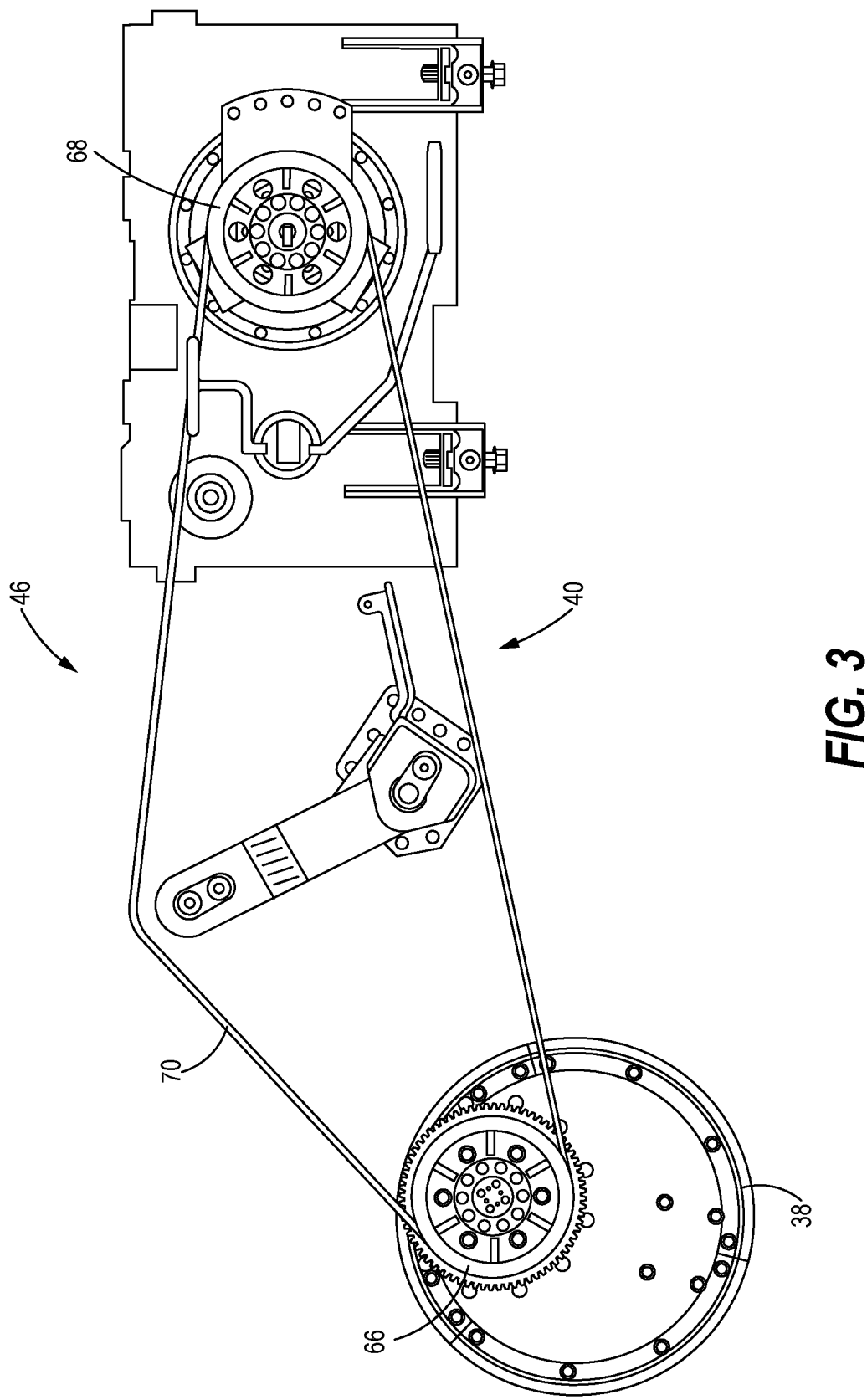
FIG. 3 is a partial side view of the rotor assembly of FIG. 2 depicting the drive layout of the present disclosure.

Referring now to FIG. 2, a perspective view, and FIG. 3 a side view of a rotor assembly 46, respectively, is shown. The rotor assembly 46 includes the rotor 38, a gearbox 50 and a bearing assembly 52. Moreover, the rotor 38 may be a hollow structure that defines an interior cavity 53 to at least partially house the gearbox 50 and the bearing assembly 52. Accordingly, the gearbox 50 may be mounted onto a gearbox mounting ring 54 and the bearing assembly 52 may be mounted onto a bearing assembly mounting ring 56 that are each fixedly attached along an inner surface of the rotor 38. As such, the gearbox 50 and bearing assembly 52 may be, at least partially, housed or otherwise contained within the interior cavity 53 of the rotor 38. For the sake of description and illustration, portions of the mixing chamber 34 (FIG. 1) may be partially or completely removed. For example, in FIG. 3 the first side plate 36 and second side (not shown) are removed to better illustrate components (e.g., rotor 38) that are housed within the mixing chamber 34. Furthermore, FIGS. 2 and 3 do not include a plurality of cutting bits or tools 48 arranged around the outer surface of the rotor 38, as illustrated in FIG. 1. The plurality of cutting tools 48 help to remove and/or mix the surface material of the paved surface 22 during operation of the rotor assembly 46.

In some embodiments, the gearbox 50 may include a gearbox input 58 and a gearbox output 60; however other configurations of the gearbox 50 are possible. The gearbox input 58 may be fixedly attached to a rotor input shaft 62 that extends axially away from the gearbox input 58 and into a rotor drive train housing 64. Moreover, the rotor drive train 40 may include a rotor drive wheel 66 that is housed within the rotor drive train housing 64 and the rotor input shaft 62 may be rotatably coupled to the rotor drive wheel 66. The rotor drive train 40 may further include a main clutch 68 that is operably coupled to the power generation source 30 by an input drive shaft (not shown). The main clutch 68 and the rotor drive wheel 66 are operably coupled by a drive belt 70 to transfer power generated by the power generation source 30 through the main clutch 68 to the rotor drive wheel 66. The rotor 38 is thus rotatably driven by the rotor drive train 40 which itself is configured to receive power from the power generation source 30 (FIG. 1).

Furthermore, the gearbox ouput 60 of the gearbox 50 may be fixedly attached to the gearbox mounting ring 54, and the gearbox input 58 may be rotatably coupled to the gearbox output 60, and then through a planetary gear arrangement that is contained within the gearbox output 60. Thus, in some embodiments of the rotor assembly 46, the gearbox 50 may be configured to transfer power from the power generation source 30 through the rotor drive train 40 to rotatably drive the rotor 38 at a predetermined speed. In one non-limiting example, the gearbox 50 may be adapted to operate at one of a first predetermined speed and a second predetermined speed. The first predetermined speed and the second predetermined speed may be achieved through different gear ratios that are obtainable through the gearbox. Additionally, in some embodiments, the first predetermined speed may be associated with a start up condition of the rotor assembly and a slower rotational speed of the rotor 38. Moreover, the second predetermined speed may be associated with an operational speed of the rotor 38 that is used to remove and/or mix the material surface of the paved surface 22 (FIG. 1).

Figure 4:
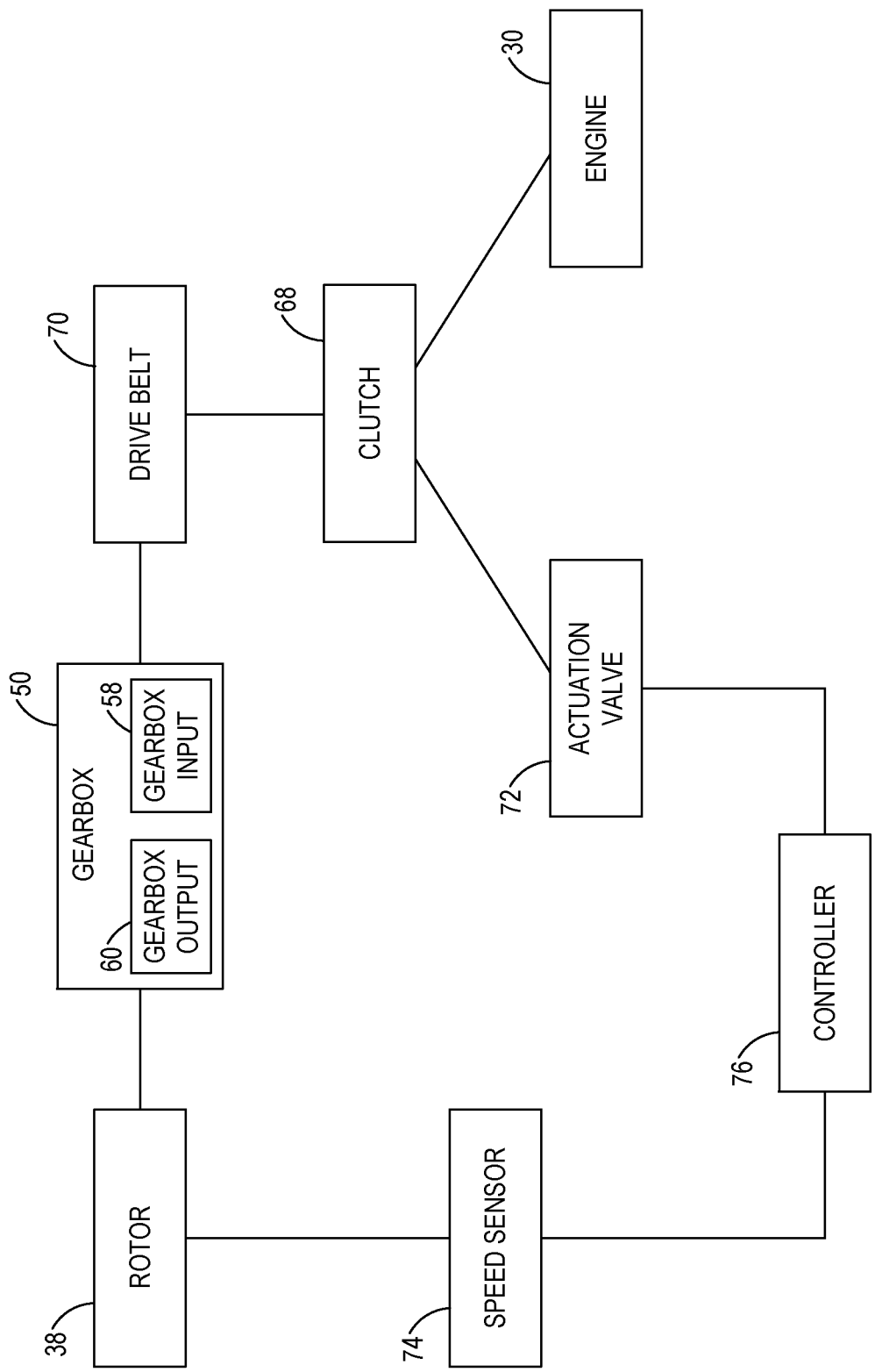
FIG. 4 is a block diagram schematically depicting the rotary mixer.

In order to overcome the problem of starting the rotor rotation without the gearbox 50, clutch 68 and other shift components being fully engaged, and thus causing damage to the rotary mixer 20, the following system may be employed. Referring now to FIG. 4, the rotary mixer is shown in black box diagram form. As depicted therein, the power generation source 30 (engine) of the mixer 20 is operatively connected to the clutch 68. The clutch 68 is further shown connected by the drive belt 70 to the gearbox input 58. The gearbox input 58 is in turn further operatively coupled to the gearbox output 60 which in turn is connected to the rotor 38. If the rotor 38 is used without all such components being fully engaged, damage to the rotary mixer 20 can occur.

As a result, the present disclosure further includes an actuation valve 72, a speed sensor 74 and a processor 76 as also shown in FIG. 4. The actuation valve 72 is operably coupled to the clutch 68 and adapted to pulse or otherwise actuate the clutch 68 between first and second positions. In one embodiment the actuation valve 72 is a solenoid valve adapted to receive signals and generate pulses for predetermined periods of time. The speed sensor 74 is operatively associated with the rotor 38 and adapted to measure the rotational speed of the gearbox 50 to generate a signal indicative of rotor speed. The processor 76 is an electronic controller operatively associated with both the speed sensor 74 and the actuation valve 72. The processor 76 may be a separate controller and work in concert with the machine controller 28, or be a module or other part of the machine controller 28. In any event, the processor 76 is adapted to receive the signal indicative of rotor speed from the speed sensor 74 and compare same to a threshold value indicating safe operation. If the processor 76 determines the rotor speed is below the threshold, the processor 76 sends a signal to the actuation valve 72 which in turn causes the clutch 68 to lightly engage and cause rotation. More specifically, the actuation valve 72 is pulsed on and off which imparts a rocking motion into the clutch 68 and in turn the gearbox 50. This pulsing continues until rotation is measured at the gearbox 50. This small amount of gearbox input caused by the pulsing allows for the shift components to align and fully engage. Once fully engaged, the rotor 38 can be safely operated without causing damage. In alternative embodiments, the actuation valve 72 can be a hydraulic valve or other type of valve.

INDUSTRIAL APPLICABILITY

In operation, the present disclosure can find application in many industries such as highway repair, haul road construction and agricultural improvement. As one specific example, the teachings of the present disclosure can be used in the design and manufacture of rotary mixers, and specifically the start-up of rotary mixers in a safe and reliable manner that does not cause damage thereto.

Figure 5:
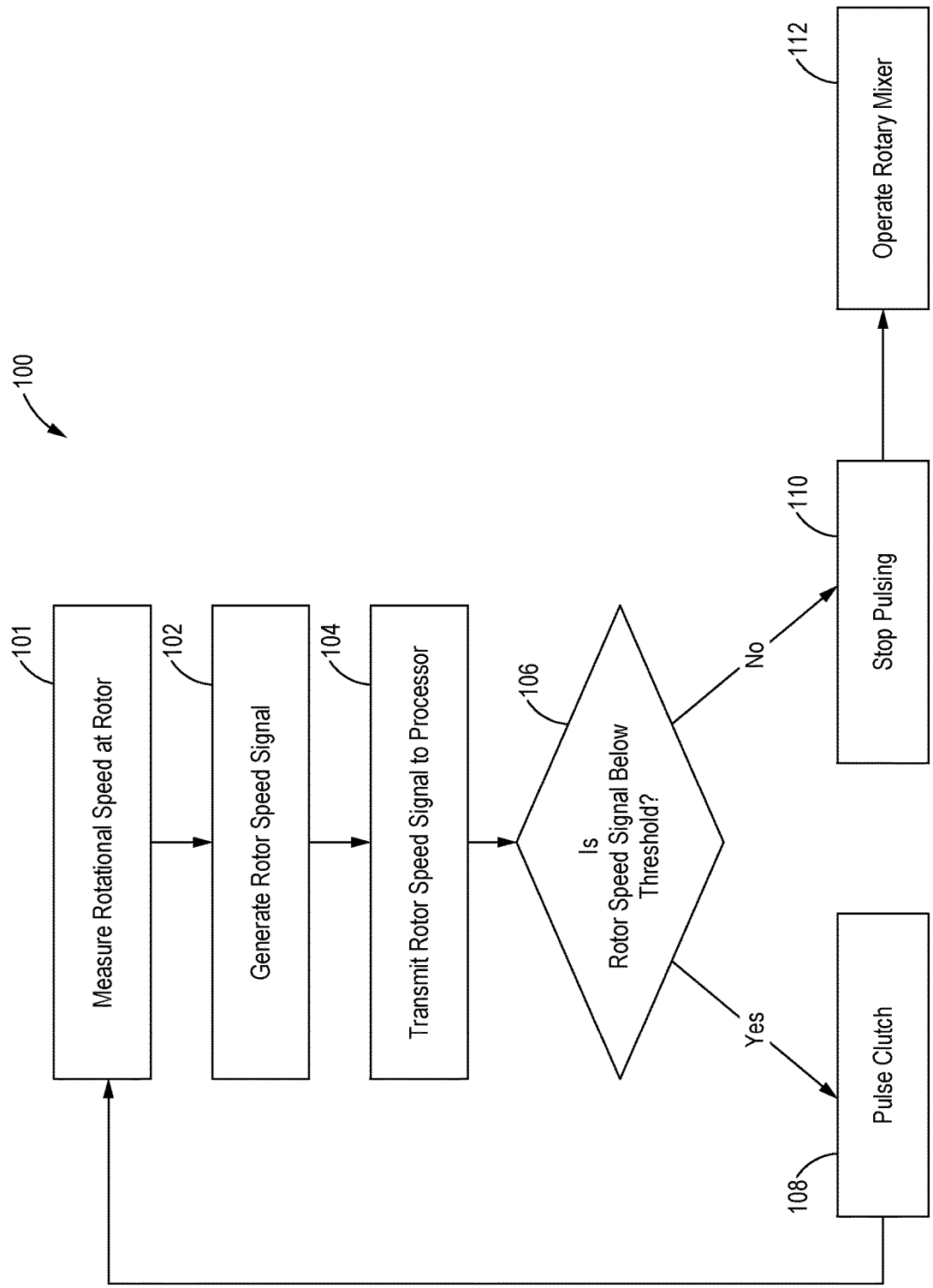
FIG. 5 is flowchart depicting a sample sequence of steps which may be practiced by the rotary mixer of the present disclosure.

Referring now to FIG. 5, a method 100 of operation of the rotary mixer is illustrated in flowchart format. As shown therein, in a first step 101, the speed sensor 74 measures the rotational speed of the rotor 38. This may be accomplished by using any number of known rotational or speed sensors available on the market such as, but not limited to tachometers, encoders, magnetic sensors, Hall effect sensors and the like.

In a second step 102, the measured rotor speed is used to generate a signal indicative of that speed. The signal indicative of rotor speed is then transmitted to the processor 76 in a step 104.

Once received by the processor 76, in a step 106, the processor 76 compares the measured rotor speed to a predetermined threshold speed at which it is known to be safe to operate the rotary mixer 20. If the outcome of that comparison step 106 is that the measured speed is below the safe threshold speed, the processor 76 pulses the solenoid valve 72 in a step 108 to cause the clutch 68 to slightly move. After such pulsing, the method 100 reverts back to step 101 to determine again the rotor speed and whether the rotor speed is above the threshold speed. This pulsing process can continue for as many times as is needed to cause the shifting components to fully engage and the rotor 38 to reach above the safe threshold speed before operating the rotor 38.

In a step 110 if the outcome of the comparison step 106 is that in fact the rotor speed has surpassed the threshold speed, pulsing stops and the rotor mixer can be fully engaged and operated as indicated in a step 112.

The pulses can be generated for any length of time determined to be effective for starting the rotor 38. For example, in one embodiment the clutch 68 is pulsed in increments of 0.6 seconds, paused or delayed for a predetermined period of time such as 0.2 or 0.3 seconds and then pulsed again. This process can be conducted for as many times as needed, although it has been determined that a maximum number of pulses should be set in the processor 76 to avoid the situation wherein the speed sensor 74 is malfunctioning and causing inaccurate rotor speed readings. In one embodiment, the maximum number of pulses is set in the processor 76 as thirty (30) pulses, but other limits can certainly be employed.

While aspects of the present disclosure have been particularly shown and described with reference to the embodiments above, it will be understood by those skilled in the art that various additional embodiments may be contemplated by the modification of the disclosed machines, systems and assemblies without departing from the scope of what is disclosed. Such embodiments should be understood to fall within the scope of the present disclosure as determined based upon the claims and any equivalents thereof.

What is claimed is:

1. A rotor assembly for a rotary mixer, the rotor assembly comprising:
   a main drive clutch enclosed in a drivetrain housing;
   an actuation valve operably coupled to the main drive clutch, the actuation valve configured to actuate the main drive clutch;
   a gearbox having an input and an output, the gearbox input operably coupled to a rotor drive wheel, the gearbox output fixedly attached to a gearbox mounting ring;
   a rotor, the rotor defining an interior cavity to at least partially house the gearbox, the gearbox mounting ring fixedly attached to an inner surface of the interior cavity of the rotor;
   a main drive belt operably coupled to the main drive clutch and the rotor drive wheel; and
   a speed sensor operably coupled to the rotor, the speed sensor measuring a rotational speed of the gearbox and generating a rotor speed signal,
   wherein the actuation valve is pulsed to actuate the main drive clutch between a first position and a second position until the rotor speed signal indicates a rotation of the rotor, and wherein when the rotor speed signal indicates the rotation of the rotor, the actuation valve stops pulsing the main drive clutch and the rotary mixer is operated.

2. The rotor assembly of claim 1, wherein the gearbox includes a set of shifting components operably coupled to the gearbox input and the gearbox output, wherein the rotation of the main drive clutch is transferred to the set of shifting components through the gearbox input.

3. The rotor assembly of claim 1, wherein the actuation valve is activated by sending a control signal to the actuation valve, wherein the actuation valve is a solenoid valve, and wherein the control signal sent to the actuation valve causes at least one pulse of the actuation valve between an on position and an off position.

4. The rotor assembly of claim 3, wherein a pulse cycle actuates the solenoid valve a predetermined number of times between the on position and the off position.

5. The rotor assembly of claim 4, wherein the pulse cycle stops when the rotational speed of the gearbox is above a predetermined rotor speed threshold value.

6. The rotor assembly of claim 5, wherein the pulse cycle includes a first pulse cycle to actuate the solenoid valve into the on position for an initial on position cycle time and into the off position for an initial off position cycle time, and wherein the pulse cycle further executes subsequent pulse cycles to actuate the solenoid valve into the on position for a subsequent on position cycle time and into the off position for a subsequent off position cycle time.

7. The rotor assembly of claim 1, wherein the actuation valve is a proportional solenoid valve and a control signal adjusts the solenoid valve between a first actuation pressure and a second actuation pressure.

8. A control system for controlling shifting of a rotor assembly, the control system comprising:
   a main drive configured to rotatably drive the rotor assembly;
   a main drive clutch operably coupled to a drivetrain housing of the main drive, the main drive clutch having an engaged position and a disengaged position;
   an actuation valve operably coupled to the main drive clutch, the actuation valve configured to actuate the main drive clutch;
   a gearbox having an input and an output, the gearbox input operably coupled to a rotor drive wheel, the gearbox input rotatably coupled to the gearbox output, the gearbox output fixedly attached to a gearbox mounting ring;
   a rotor, the rotor defining an interior cavity to at least partially house the gearbox, the gearbox mounting ring fixedly attached to an inner surface of the interior cavity of the rotor;
   a main drive belt operably coupled to the main drive clutch and the rotor drive wheel such that a rotation of the main drive clutch imparts a rotation on the gearbox;
   a speed sensor operably coupled to the rotor, the speed sensor measuring a rotational speed of the gearbox and generating a rotor speed signal;
   a controller communicably coupled to the actuation valve and the speed sensor, the controller programmed to receive and analyze the rotor speed signal, the controller configured to pulse the actuation valve to actuate the main drive clutch between the engaged position and the disengaged position until the rotor speed signal indicates a rotation of the rotor, wherein when the rotor speed signal indicates a rotation of the rotor, the controller is configured to stop pulsing the actuation valve, to activate the actuation valve to actuate the main drive clutch into the engaged position, and the rotor assembly is operated.

9. The control system of claim 8, wherein during the pulsing of the actuation valve, rotation of the main drive clutch is transferred to the gearbox, and wherein the transferred rotation aligns and fully engages a set of components of the rotor assembly.

10. The control system of claim 8, wherein the actuation valve is a solenoid valve and wherein sending a control signal to the actuation valve causes at least one pulse of the actuation valve between an on position and an off position.

11. The control system of claim 10, wherein the controller is programmed to transmit a plurality of control signals to the solenoid valve, and wherein the control signal activates a pulse cycle of the solenoid valve, each pulse cycle including a predetermined number of pulses.

12. The control system of claim 11, wherein the predetermined number of pulses is programmed to be 30 pulses or less.

13. The control system of claim 11, wherein the controller is programmed to execute a first pulse cycle to actuate the solenoid valve into the on position for an initial on position cycle time and into the off position for an initial off position cycle time, and wherein the controller is further programmed to execute subsequent pulse cycles to actuate the solenoid valve into the on position for a subsequent on position cycle time and into the off position for a subsequent off position cycle time.

14. The control system of claim 8, wherein the actuation valve is a proportional solenoid valve and the control signal includes adjusting the solenoid valve between a first actuation pressure and a second actuation pressure.

15. A rotary mixer, comprising:
   a frame;
   a power source mounted onto and supported by the frame;
   a rotor assembly operably mounted to the frame; and
   a control system for controlling shifting of the rotor assembly, the control system including:
      a main drive configured to rotatably drive the rotor assembly;
      a main drive clutch operably coupled to a drivetrain housing of the main drive;
   an actuation valve operably coupled to the main drive clutch, the actuation valve configured to actuate the main drive clutch between an engaged position and a disengaged position,
   a gearbox having an input and an output, the gearbox input operably coupled to a rotor drive wheel, the gearbox input rotatably coupled to the gearbox output, the gearbox output fixedly attached to a gearbox mounting ring,
   a rotor, the rotor defining an interior cavity to at least partially house the gearbox, the gearbox mounting ring fixedly attached to an inner surface of the interior cavity of the rotor,
   a main drive belt operably coupled to the main drive clutch and the rotor drive wheel,
   a speed sensor operably coupled to the rotor, the speed sensor configured to measure a rotational speed of the gearbox, generate a rotor speed signal, and transmit the rotor speed signal, and
   a controller communicably coupled to the actuation valve and the speed sensor, the controller programmed to receive and analyze the rotor speed signal, the controller configured to pulse the actuation valve to actuate the main drive clutch between the engaged position and the disengaged position thereby imparting a rocking motion into the main drive clutch, the controller configured to pulse the actuation valve until the rotor speed signal indicates a rotation of the rotor, and when the rotor speed signal indicates the rotation of the rotor, the controller is configured to stop pulsing the actuation valve and to signal the actuation valve to actuate the main drive clutch into the engaged position for operation of the rotor assembly.

16. The rotary mixer of claim 15, wherein the rotation of the main drive clutch is transferred to the gearbox, and wherein the transferred rotation aligns and fully engages a set of components of the rotor assembly.

17. The rotary mixer of claim 15, wherein the actuation valve is a solenoid valve and the control signal sent to the actuation valve causes at least one pulse of the actuation valve between an on position and an off position.

18. The rotor assembly of claim 17, wherein a pulse cycle pulses the solenoid valve a predetermined number of times.

19. The rotor assembly of claim 18, wherein the predetermined number of pulses is programmed to be 30 pulses or less.

20. The rotor assembly of claim 19, wherein the pulse cycle includes a first pulse cycle to actuate the solenoid valve into the on position for an initial on position cycle time and into the off position for an initial off position cycle time, and wherein the pulse cycle further executes subsequent pulse cycles to actuate the solenoid valve into the on position for a subsequent on position cycle time and into the off position for a subsequent off position cycle time.

* * * * *